Nov. 14, 1950     J. O. LE COMTE     2,529,561
MICROMETER DUST GUARD
Filed April 30, 1947

INVENTOR.
JOSEPH O. LE COMTE
BY
ATTORNEYS

Patented Nov. 14, 1950

2,529,561

UNITED STATES PATENT OFFICE 2,529,561

MICROMETER DUST GUARD

Joseph O. Le Comte, Cleveland, Ohio

Application April 30, 1947, Serial No. 744,815

1 Claim. (Cl. 288—3)

This invention relates to dust guards to preclude the entry of abrasives or other foreign matter within the spindle head of a micrometer caliper or similar instrument.

One of the objects of the invention is to provide a wiper ring for the spindle of a micrometer caliper and a readily attachable retainer therefor.

Another object of the invention is to provide a wiper ring supporting structure which may be mounted upon a micrometer caliper without mutilation of the frame thereof or substantial alteration in the appearance of the caliper.

Another object of the invention is to provide a spindle wiper which is designed for interchange-assembly upon a number of micrometer calipers of various manufacture, size or design.

Further objects of the invention reside in the construction of a dust guard for a micrometer caliper which is light in weight, sturdy of structure, efficient of operation and economic of manufacture.

Other objects and advantages more or less ancillary to the foregoing and the manner in which all the various objects are realized will appear in the following description, which, considered in connection with the accompanying drawings, sets forth the preferred embodiment of the invention.

Referring to the drawings.

Figure 1:
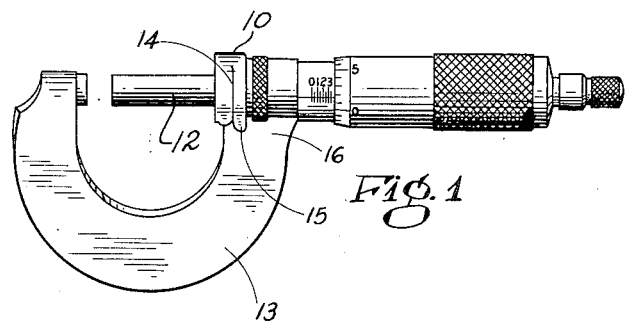
Fig. 1 is a side elevational view of a micrometer caliper illustrating the dust guard in place on the frame of the instrument.
Figure 2:
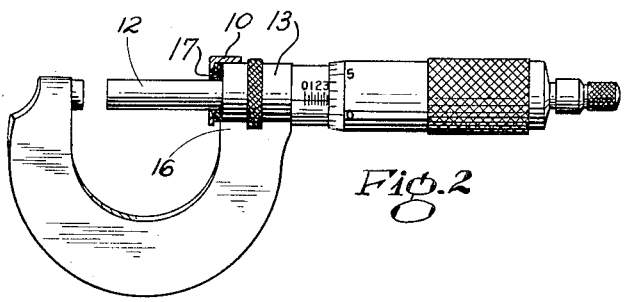
Fig. 2 is a similar view of the caliper with the improved dust guard and retainer shown in section.
Figures 3, 4, 5, 6:
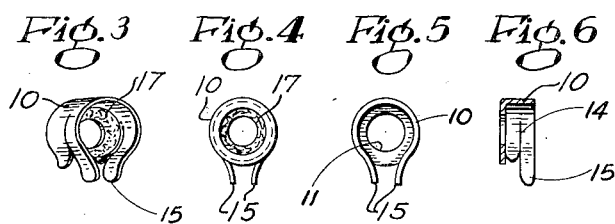
Fig. 3 is a view in perspective of the improved dust guard.
Fig. 4 is a front and elevational view thereof.
Fig. 5 is a rear elevational view of the wiper ring retainer.
Fig. 6 is a vertical section through the retainer illustrated in Fig. 5.
Figure 7:
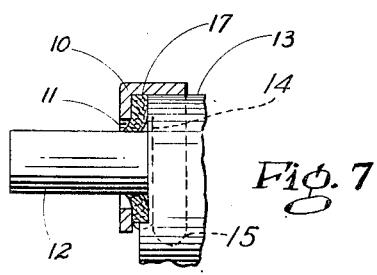
Fig. 7 is an enlarged sectional view of the wiper ring and retainer illustrated in place on the frame of the caliper.

Referring first to Figs. 1 and 7, the dust guard comprises generally a pressed spring steel cup 10 formed with an opening 11 in the end wall thereof for reentrant engagement with the spindle 12 of a micrometer caliper 13. The side wall of the cup is provided with kerfs 14 defining fingers 15 adapted for engagement with the side walls of the frame of the caliper 13 subjacent the journal bearing for the spindle 12. The free ends of the fingers are disposed in convergent relation with each other in their unstressed form (Fig. 3) and are bent for intimate engagement with the flat portions 16 of the frame when sprung into assembled relation therewith. The kerfs are disposed a requisite distance from the end wall of the cup to provide a pocket of adequate depth to receive the wiper or washer 17, the remaining portion of the side wall being designed to provide fingers of a width which will afford sufficient frictional resistance to restrain axial movement of the cup during the translation of the spindle. The washer is mounted for snug wiping engagement upon the spindle 12 and the circumferential edge thereof is firmly supported by the inner side and end walls of the cup. The washer is preferably formed of leather impregnated with light oil or a similar material which is capable of arresting dust or foreign matter of the character that has a deleterious effect upon the spindle journal and lead screw. Obviously, other fibrous materials such as felt may be substituted for the leather washer.

The side wall of the cup forward the fingers 15 is recessed to clear the flat portion of the frame of the caliper and the edges thereof are rounded and flared outwardly to facilitate intimate engagement thereof with the frame.

The dust guard is assembled on the caliper by forcing the washer over the spindle, springing the ears 15 over the body of the frame and forcing the cup rearwardly over the end of the spindle bearing until the washer is held in impinged relation with the forward face of the spindle bearing. The spring fingers are formed to exert sufficient pressure against the frame to overcome the friction between the spindle and washer and thus prevent movement of the cup during axial translation of the spindle.

When a caliper, provided with the improved dust guard, is in use in connection with a grinding operation or in similar environs, the washer will wipe the spindle during adjustment thereof and thus prevent the entry of abrasives within the spindle head and nut for the micrometer screw.

Although the foregoing description is necessarily of a detailed character, in order that the invention may be completely set forth, it is to be understood that the specific terminology is not intended to be restrictive or confining, and that various rearrangements of parts and modifications may be resorted to without departing from the scope or spirit of the invention as herein claimed.

What I claim is:

A dust guard for the spindle of a micrometer comprising a retainer member having a generally sleeve-like portion circumferentially discontinuous throughout its length, an end wall integral with said sleeve-like portion and having an aperture adapted to receive and clear the spindle of a micrometer, said sleeve portion being slit along a plane generally normal to the sleeve axis and intermediate the length of the sleeve to form first and second radially expansible portions, the first of said expansible portions being joined to said end wall at one edge and being free to expand somewhat due to its discontinuity, the second expansible portion forming a pair of opposed spring fingers to accommodate and grip a micrometer barrel, the edge of said first expansible portion also being adapted to spring over the end of the micrometer barrel, and a packing washer for sealing engagement with the micrometer spindle disposed in the generally cup-shaped recess formed by said end wall and first expansible portion.

JOSEPH O. LE COMTE.

REFERENCES CITED

The following references are of record in the file of this patent:

UNITED STATES PATENTS

| Number | Name | Date |
|---|---|---|
| 674,635 | Perkins | May 21, 1901 |
| 770,681 | Denegre | Sept. 20, 1904 |
| 1,065,054 | Vercombe | June 17, 1913 |
| 1,107,187 | Spalding | Aug. 11, 1914 |
| 1,234,342 | Johnson | July 24, 1917 |